F. O'NEILL.
GLASS FORMING MACHINE.
APPLICATION FILED JUNE 29, 1916.
1,315,983.
Patented Sept. 16, 1919.
7 SHEETS—SHEET 3.
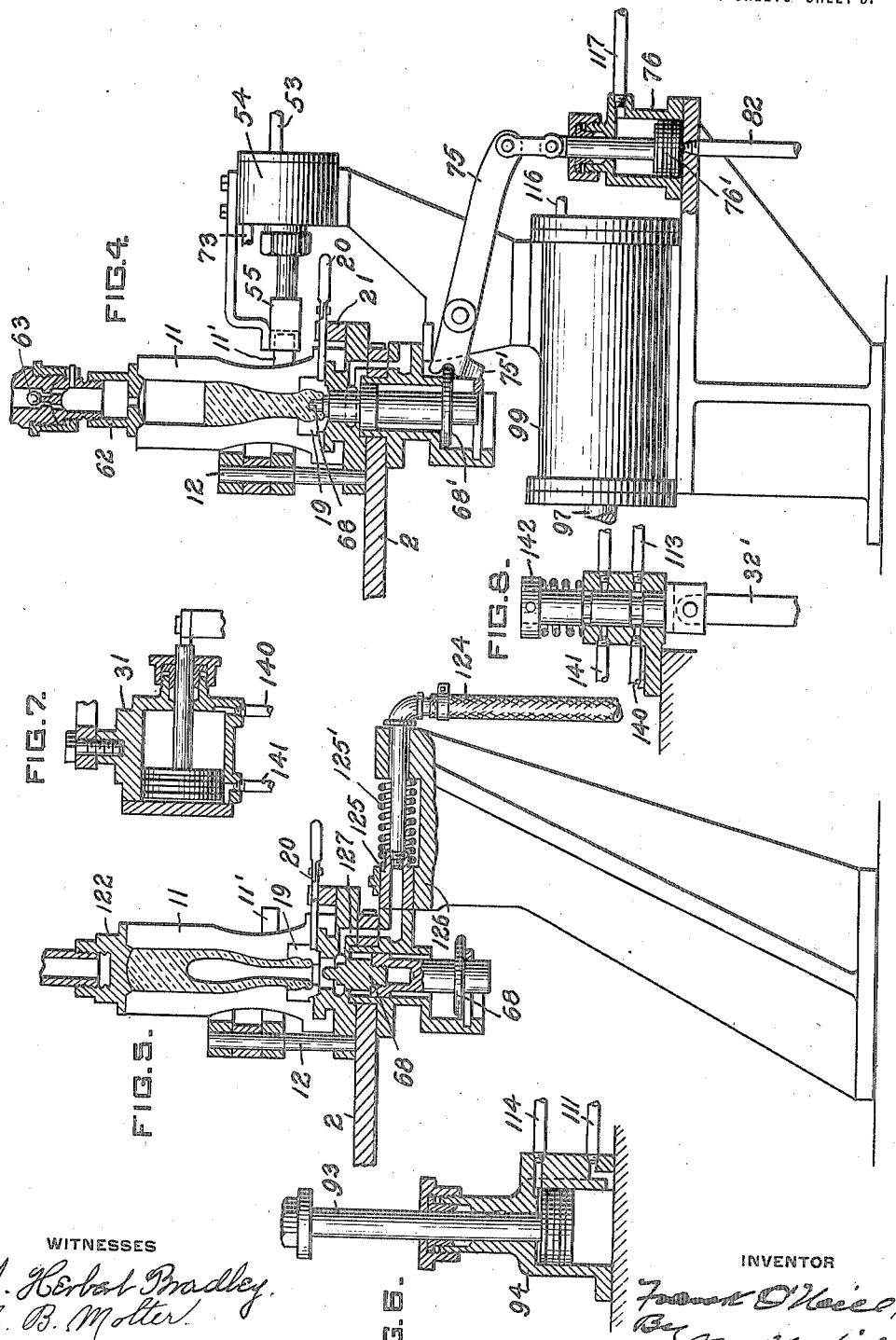

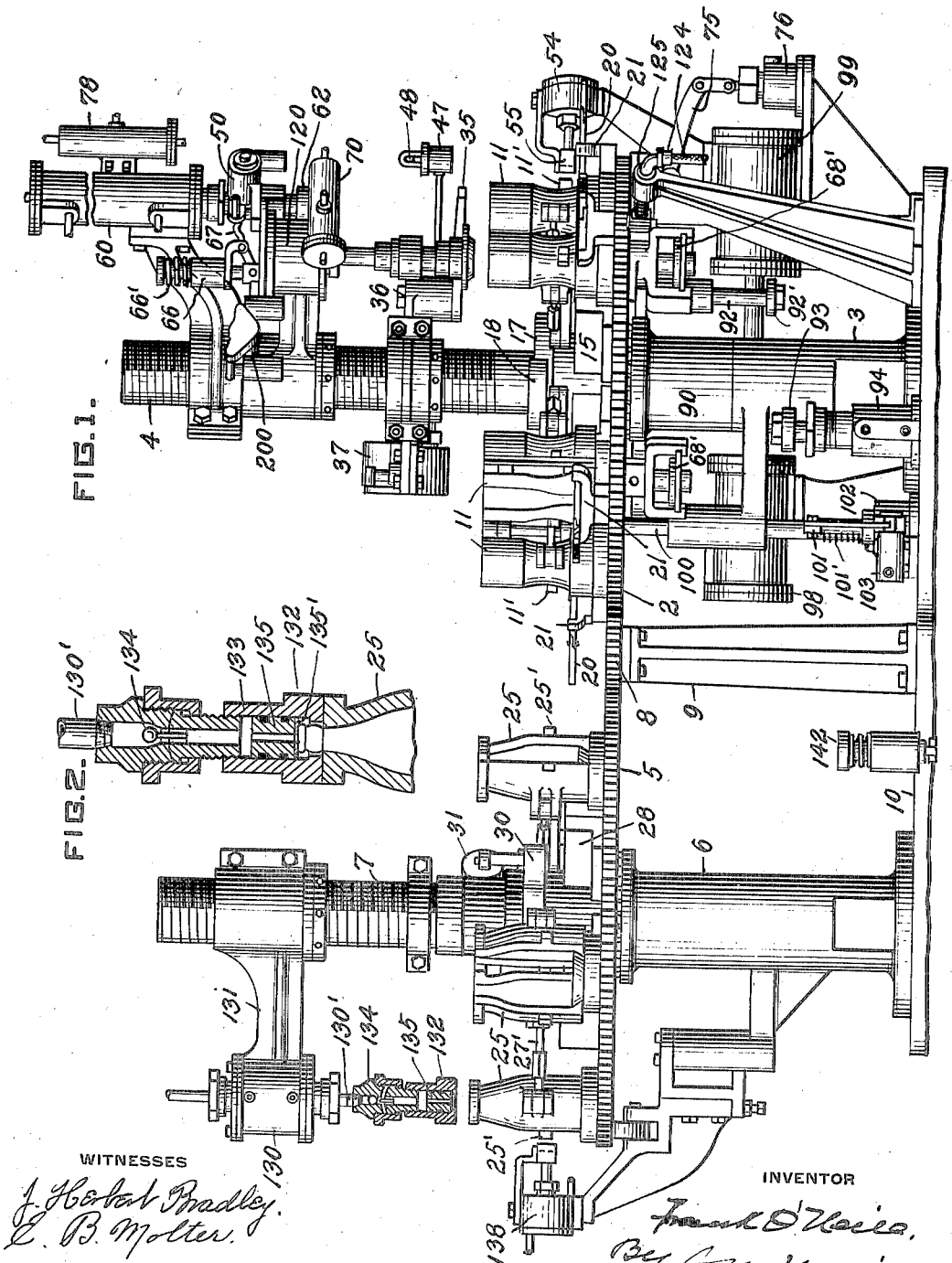

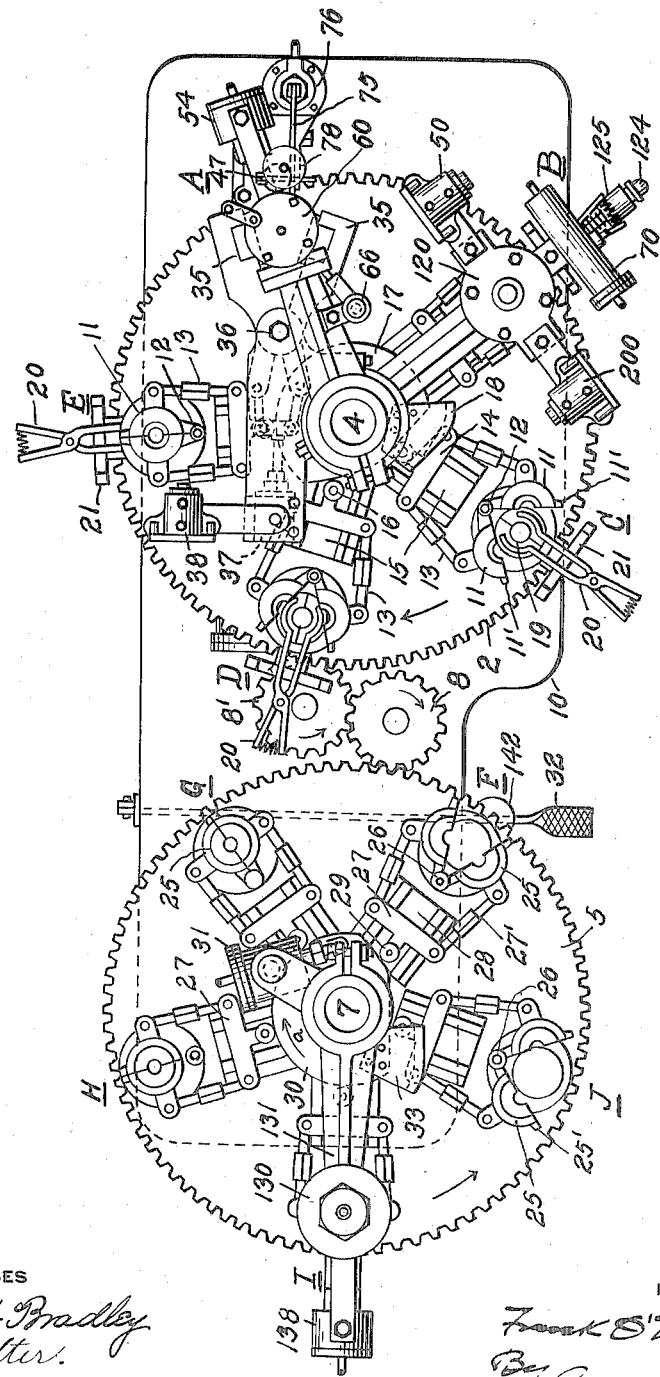

F. O'NEILL.
GLASS FORMING MACHINE.
APPLICATION FILED JUNE 29, 1916.
1,315,983.
Patented Sept. 16, 1919.
7 SHEETS—SHEET 4.
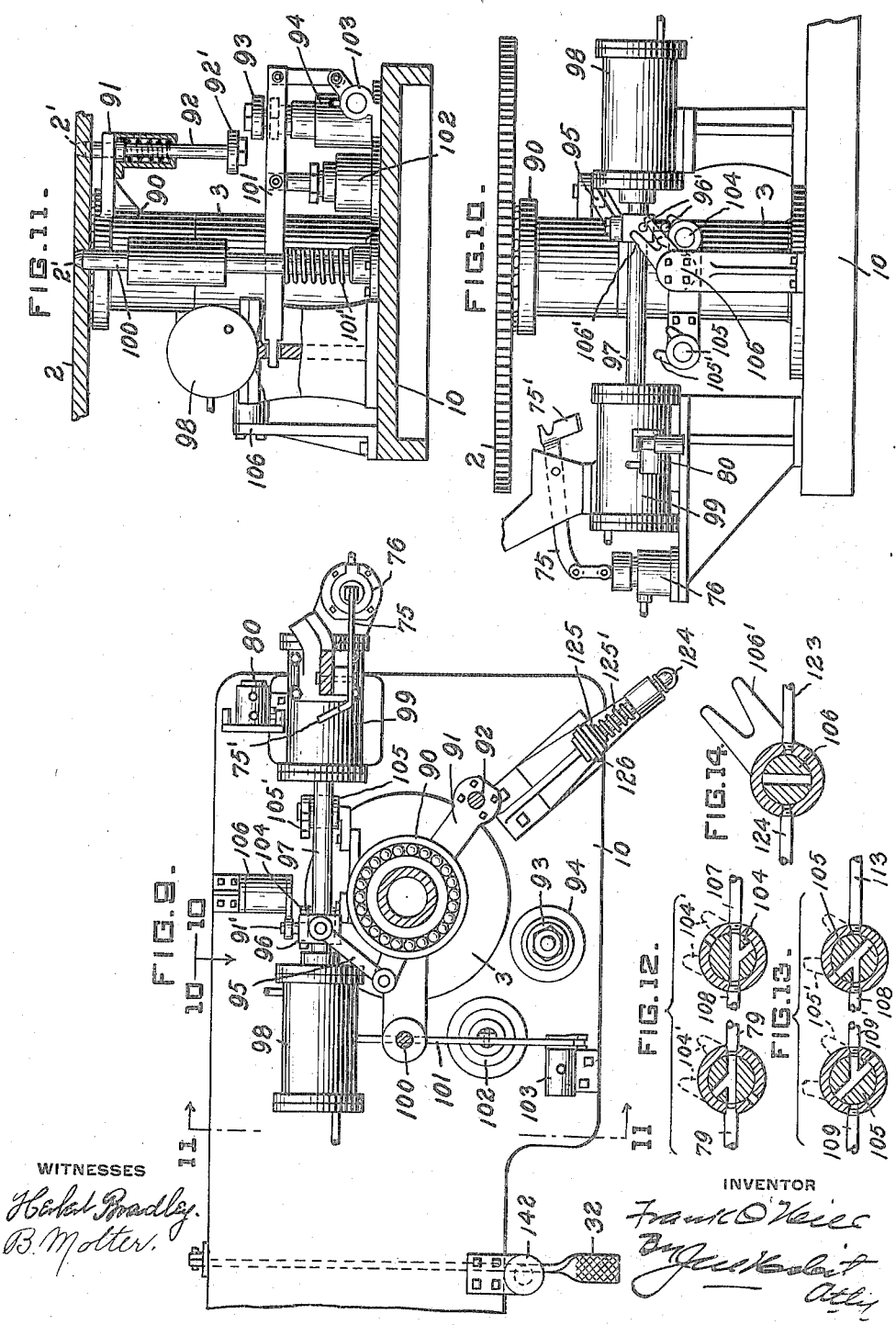
WITNESSES
INVENTOR F. O'NEILL.
GLASS FORMING MACHINE.
APPLICATION FILED JUNE 29, 1916.
1,315,983.
Patented Sept. 16, 1919.
7 SHEETS—SHEET 5.
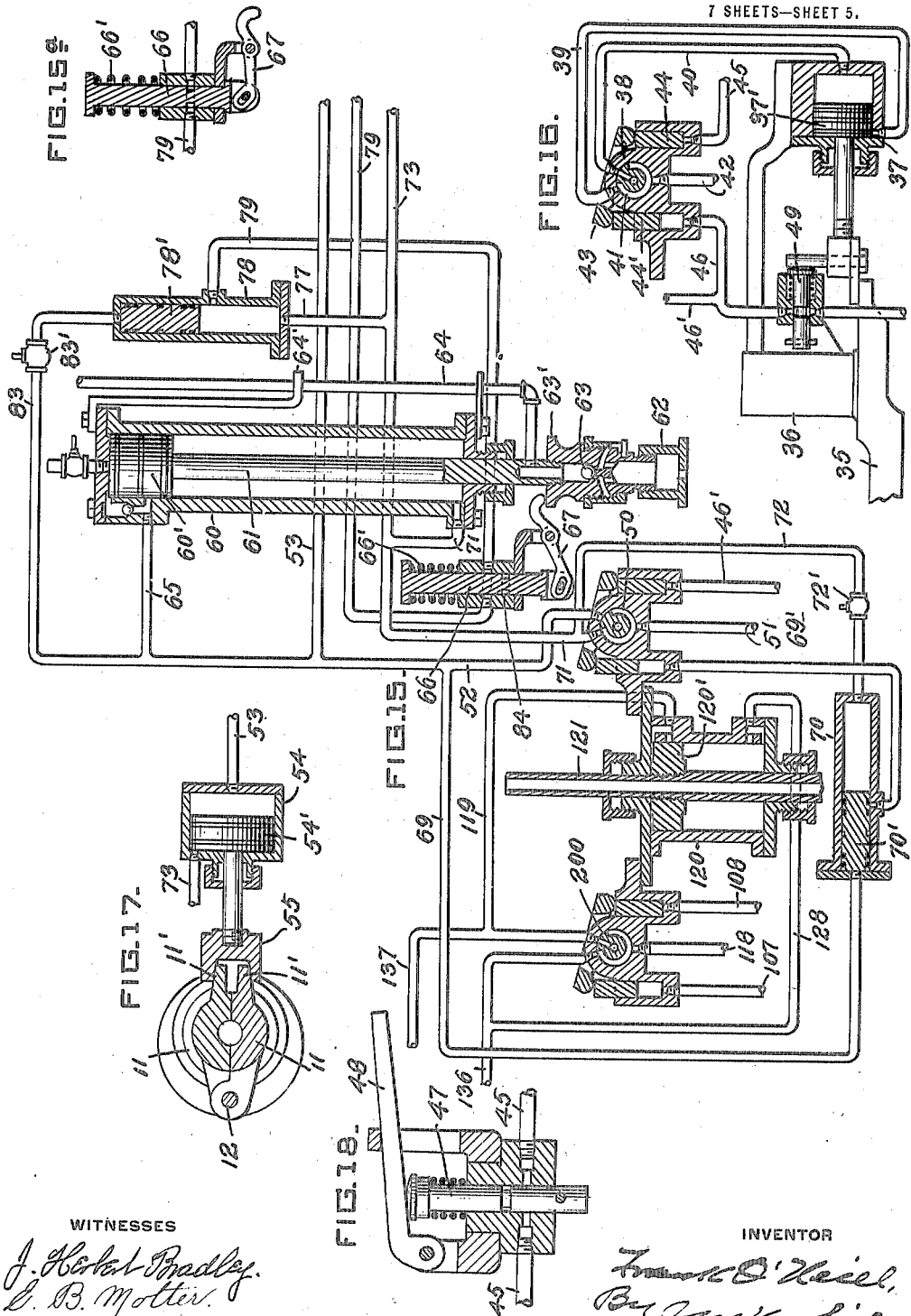
WITNESSES
INVENTOR

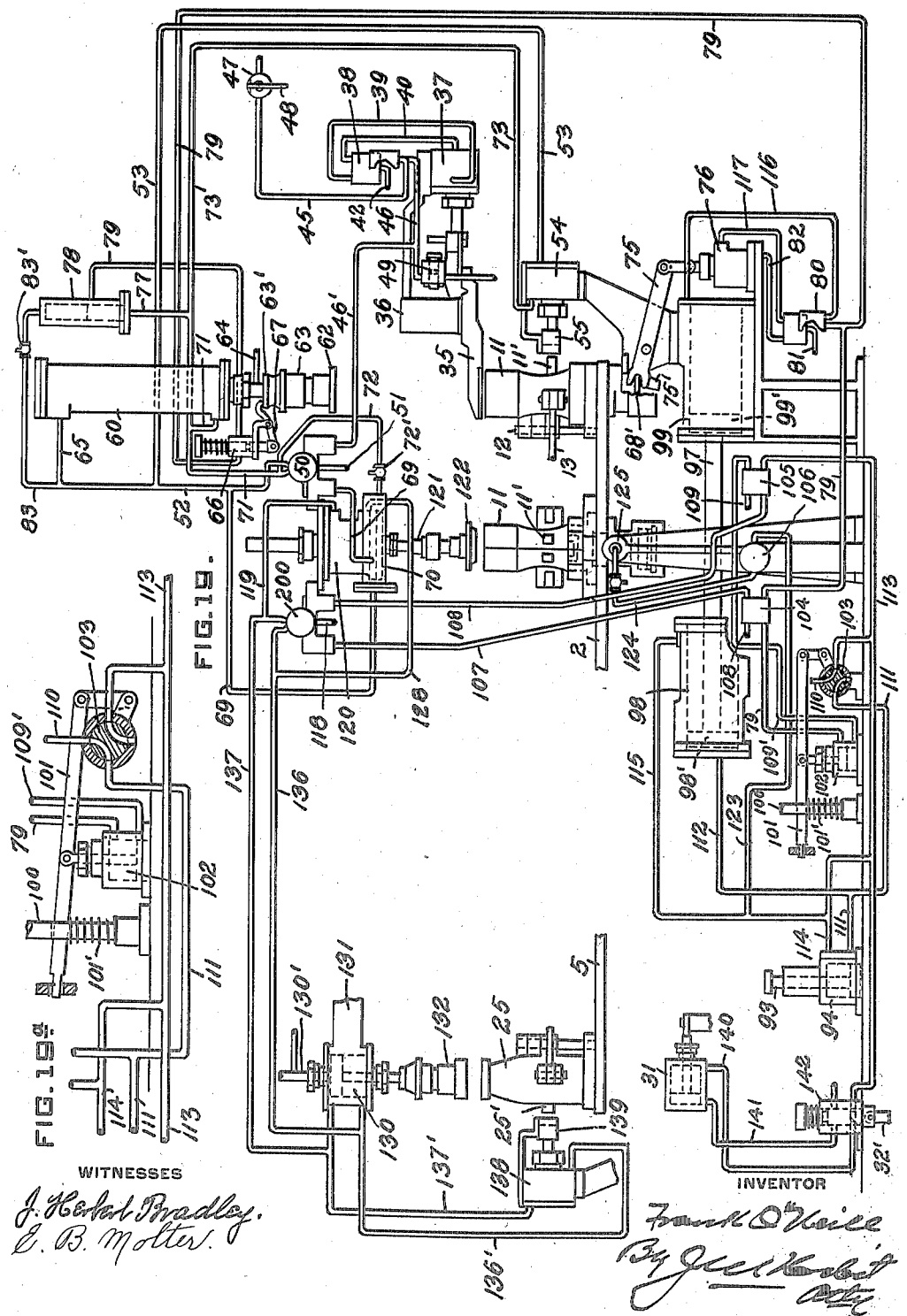

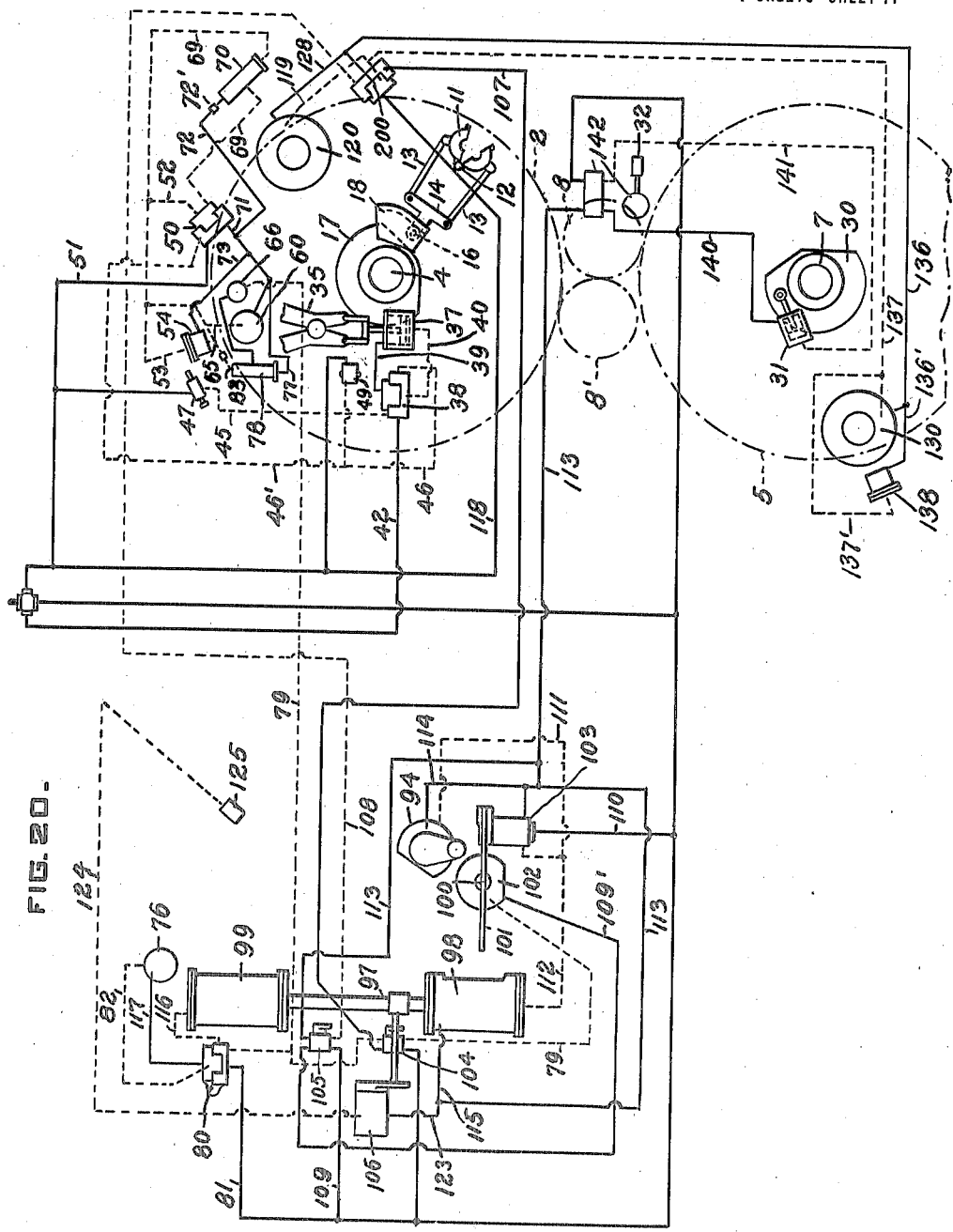

UNITED STATES PATENT OFFICE.

FRANK O'NEILL, OF TOLEDO, OHIO.

GLASS-FORMING MACHINE.

1,315,983.  Specification of Letters Patent.  Patented Sept. 16, 1919.

Application filed June 29, 1916. Serial No. 106,618.

*To all whom it may concern:*

Be it known that I, FRANK O'NEILL, a citizen of the United States, and resident of Toledo, in the county of Lucas and State of Ohio, have invented certain new and useful Improvements in Glass-Forming Machines, of which the following is a specification.

This invention relates to a semi-automatic machine for manufacturing glass bottles and similar articles having a neck formation which is produced while the glass is in the form of a blank, the article being completed by subsequently blowing the body thereof. The invention is embodied in a machine operated by compressed air that transforms a quota of molten glass into a completed bottle or like article which may pass from the machine directly into a leer.

One purpose of the invention is to so construct and arrange the machine that but two operatives are required, a gatherer to feed the blank molds and start the machine on its cycle of operations, and a boy to transfer the blanks from the blank to the blow molds, and to remove the blown bottles after they have passed from the blowing mechanism. With machines now in use of the general character of the present invention, three operatives are employed, the gatherer, a boy at one side of the machine to transfer the blanks, and a boy at the opposite side to remove the blown bottles. By a novel arrangement of the mold carriers and by properly timing the opening and closing of the molds, the work heretofore requiring two boys may be easily performed by one, thereby effecting a marked economy in the operation of the machine.

A further object is to provide improved mechanism for accomplishing the glass packing operation within the blank mold and downwardly around the plunger that forms the interior of the bottle mouth or neck extremity; also automatic means for timing the dwell of the plunger in contact with the glass, thereby accommodating the plunger operation to variations in working conditions, as well as variations in the bottles or other articles being produced. Another object is to provide improved means for effecting the opening and closing of the blank molds. In addition to the foregoing, the invention includes various structurally novel features hereinafter described, all of which contribute to providing a machine of large capacity and in which the several operations are performed with certainty and accuracy, both as to the manipulation of the glass and the time the various manipulations are performed, thereby producing absolute uniformity in the quality of the output. It is also characteristic of the machine that bottles or other articles of different shape may be produced at one and the same time, this being due to the arrangement of forming mechanisms in sets, with each set, if desired, producing a bottle of different shape.

In the accompanying drawings, Figure 1 is an elevation of the improved machine, the air pipes leading to the various operating parts being, in the main, omitted. Fig. 2 is a sectional elevation of the blowing mechanism that coöperates with the blow molds, the same being shown in blowing position. Fig. 3 is a top plan of the apparatus illustrated in Fig. 1. Fig. 4 is a sectional elevation of the mechanisms that are operative at the initial position of the blank mold for packing the glass therein and for producing the plunger-formed cavity in the neck extremity thereof, and Fig. 5 is a similar view of the mechanisms operative at the second position of the blank mold for distending the blank prior to its removal from the blank mold. Fig. 6 is a detail view of the retractor for disconnecting the reciprocating actuating mechanism from the blank mold carrier for enabling said mechanism to obtain a new hold thereon. Fig. 7 is a detail view of the cylinder and piston which operates the cam for closing and opening the blow molds. Fig. 8 is a detail view of the treadle actuated valve. Fig. 9 is a top plan of the various mechanisms located beneath the blank mold carrier. Fig. 10 is an elevation of the mechanism beneath the blank mold carrier looking in the direction of the arrow 10—10 of Fig. 9. Fig. 11 is a sectional elevation of the same parts, taken on line 11—11 of Fig. 9. Fig. 12 is a sectional detail of one of the tripper valves that is actuated by the carrier advancing mechanism, showing the two normally open ports through said valve, and Fig. 13 is a similar view of another tripper valve actuated by the same mechanism and showing the two ports through said valve in their normally closed position. Fig. 14 is a sectional detail of a third tripper valve that is actuated by the carrier advancing mechanism, the same being shown in its normally closed position. Fig. 15 is a diagrammatic view of the mechanisms for packing the glass in the blank mold and for closing the blank mold for the blank expanding operation, together with various valves and pipe connections for controlling and timing the operation of the machine. Fig. 15ª is a detail view of one of the valves illustrated in Fig. 15, showing the position of said valve when the glass packing mechanism is not fully elevated. Fig. 16 is a sectional elevation of the mechanism for actuating the shears and the controlling valve for said mechanism, and Fig. 17 is a similar view of the blank mold locking mechanism. Fig. 18 is a sectional detail view of the initial or starting valve that is actuated by the punty rod. Fig. 19 is a diagrammatic elevation of the entire apparatus, and Fig. 19ª illustrates one of the valve mechanisms and parts connected thereto in a reverse position from that shown in Fig. 19. Fig. 20 is a diagram of the apparatus, the primary purpose of which is to illustrate the air circuits, those air pipes in which air exists under pressure when the machine is in readiness to start a cycle of operations being shown by full lines, and the pipes in which no pressure exists at such time being indicated by dotted lines.

Referring to the drawings, 2 designates the horizontal blank mold carrier which is rotatable on pedestal 3 around column 4. 5 is the blow mold carrier, 6 its supporting pedestal, and 7 the column around which the carrier rotates. The toothed peripheries of carriers 2 and 5 mesh with the interposed gear wheels 8 and 8' supported by post 9, whereby the carriers move in unison but in opposite directions. Power for intermittently rotating the carriers is imparted to carrier 2, and the gearing 8, 8' in addition to causing the carriers to rotate in the desired direction, also serve to so space them from each other as to afford ample room for manipulating the molds. Pedestals 3 and 6 and post 9 are mounted on a suitable base 10.

Each of the blank molds 11 is of usual two part construction, the mold sections being hinged together and to carrier 2 at 12. The mold parts are connected by links 13 with head 14 slidable in guideway 15 on carrier 2. On the upper side of head 14 is a roller 16 which bears against the edge of a cam 17 fixed to the non-rotating column 4, Figs. 1, 3 and 20. When rollers 16 are in engagement with the concentric portion of the cam, heads 14 are held in outward position with the molds closed. Projecting from cam 17 is guide 18 grooved on its under side to embrace rollers 16, the guide being of such form as to draw rollers 16 into engagement with the eccentric portion of the cam and open the molds, as shown in the views above indicated. Cam 17 and guide 18 are so arranged that the blank molds are maintained closed at position A where the glass is placed in the mold, cut off, and packed around the plunger; also closed at the next position B where the glass is blown up or expanded in the blank mold. Upon moving from position B to position C the blank mold is opened in order that the blank may be removed to a blow mold. The mold is in the process of closing in the next position D, and is fully closed when it reaches position E, the latter being the last station before the mold is again moved to the initial position A.

Coöperating with the lower end of each blank mold 11 is a sectional neck or "finish" mold 19, the parts of which are secured to and held normally closed by the upwardly projecting pincer-like handle 20 which is adapted to rest on support 21 projecting from carrier 2. The blanks are formed in inverted position as shown in Figs. 4 and 5, and the neck mold is of such contour as to impart final shape to the neck extremity of the bottle blank.

Sectional blow molds 25 are each hinged at 26 to open and close on the blow mold carrier 5, with links 27' connecting the sections of each mold with head 27 slidable in guide 28. A roller 29 on each head 27 engages the edge of a cam 30, and this cam is mounted to oscillate around column 7, being actuated by a piston and cylinder 31 supported by said column, Figs. 1 and 3. The operation of cam 30 is such that each mold is open at position F to receive a blank transferred thereto from position C of the blank mold carrier. As soon as the blank has been placed in the mold at F a treadle 32 is depressed which, in manner presently to be explained, admits air to the outer end of cylinder 31, thereby oscillating the cam in the direction indicated by arrow a, Fig. 3, and closing the mold sections around the blank. While the cam is being thus operated the advancing movement of the carriers moves the blank to position G. The next advance of the carrier moves it to position H, and the next to position I where the blowing mechanism is located, although the latter may if desired be at position H, or at position G. Immediately following the blowing operation the above described movement of cam 30 causes guide 33 carried thereby to start to open the mold that advances from position I, whereby the mold is fully open at position J for the removal of the blown bottle. The transfer of the blank from position C to F is accomplished manually, the operator grasping handle 20 and lifting the blank from mold 11 and inverting it while in transit from one position to the other. Upon placing the blank in the blow mold at F the neck mold 19 is released therefrom and restored to support 21 at C, ready for the blank mold to close therearound as carrier 2 advances.

It is characteristic of the present invention to so arrange the blank and blow molds that only one operative is required to transfer the blank and to remove the blown bottle. Immediately after transferring a blank from C to F, the operative removes the blown bottle from the mold at position J. although that mold at such time may in fact be advancing toward position F. With the carriers arranged and moving as described, those molds to and from which the articles are lifted are all within reach of the operative stationed at that side of the machine who readily manipulates the pressed and blown articles in the manner stated. This arrangement dispenses with the services of a second operative heretofore stationed at the opposite side of the machine, whose duty it has been to remove the blown bottles as they are advanced from the blowing mechanism. A marked economy in the cost of operating the machine is thus effected.

At position A of the blank mold carrier 2 the following operations take place: The operator places a quota of glass into the open top blank mold and at the proper instant causes the punty rod (by means of which the glass is transferred from the tank) to operate a valve, and the movement of this valve causes the entire machine to perform a complete cycle of operations which, by the various instrumentalities hereinafter described, are performed at the proper instants and with mechanical precision. At position A, shears are operated to sever the exact amount of glass from the quota carried by the punty rod, the glass settling down in the open top mold and around a vertically movable plunger which is then in raised position as in Fig. 4. Also at position A, a lock device is actuated for securing together the sections of the blank mold. Also at position A, a vertically movable blowing head closes the top of the blank mold as in Fig. 4 and air is admitted which packs the molten glass, causing it to fully conform to the contour of the neck mold. Before passing from position A, the plunger is withdrawn as shown in Fig. 5, and upon reaching position B connection is made with a compressed air inlet from which air is admitted to the cavity in the blank created by the plunger, and the blank is expanded as shown in Fig. 5. But before being thus expanded a cap is lowered, closing the upper end of the mold. Before leaving position B the cap is raised, so that when the next intermittent movement of carrier 2 advances the blank to position C, the mold is free to open as in Fig. 3 so that the blank may be transferred to a blow mold at F.

At position A the shears 35 are above the center of the blank mold, being pivotally supported at 36 on a bracket projecting from column 4 and connected to the piston of a cylinder 37. The shears are normally open with their actuating piston retracted, as in Fig. 20. The flow of compressed air to opposite ends of cylinder 37 is controlled by valve 38, Figs. 16 and 19, a pipe 39 connecting one side of said valve with the inner end of the cylinder, and a pipe 40 similarly connecting the other side of the valve with the outer end of the cylinder. The normal position of the parts is the reverse of that shown in Fig. 16.

Valve 38, known as a butterfly valve, is typical of a number of valves used at different points in the machine, the ported valve piston 41 being always open to a source of compressed air 42 so that in one position air is admitted to pipe 39, and in another position to pipe 40. The valve piston is oscillated by the double arm 43, one branch thereof being engaged by tappet 44 and the other branch by tappet 44'. Compressed air is admitted to tappet 44 through pipe 45, and to tappet 44' through pipe 46.

Pipe 45 is in communication with a source of compressed air, and this pipe is maintained normally closed by valve 47, Figs. 18 and 19, said valve being adapted to be depressed and opened by arm 48 upon receiving pressure from the punty rod (not shown) at the instant the operator or gatherer desires the shears to cut off the glass, depression of arm 48 opening pipe 45 and moving valve 38 from the position shown in Fig. 16. The forward movement of piston 37' opens the normally closed valve 49 in pipe 46, Fig. 16, thereby restoring valve 38 to the position shown in Fig. 16 and shutting off the air from pipe 40, and at the same time admitting air through pipe 39 to the inner end of cylinder 37 and restoring piston 37' to normal position and opening the shears and at the same time closing valve 49. The momentary admission of air to pipe 46 permits air to flow through branch pipe 46', Figs. 15 and 19, to one side of butterfly valve 50, reversing the position of the latter from that shown in Fig. 15 and thereby placing live air line 51 in communication with pipe 52. Various functions are performed by the compressed air thus admitted to pipe 52.

Branch 53 of pipe 52 extends to the outer end of the mold lock cylinder 54, Figs. 17 and 19, advancing the piston 54' thereof and causing socket 55 on the piston rod to embrace lugs 11' projecting from the sections of blank mold 11 and locking the blank mold closed for the operations that take place at position A.

Above and in line with mold position A is cylinder 60 having its piston 60' connected by rod 61 with blowing head 62 which when the piston is lowered is adapted to close the open upper end of the blank mold and admit air through valve 63 thereto for packing the glass therein and downwardly in the neck mold 19 and around plunger 68, which at position A is raised as in Fig. 4. Air is supplied to valve 63 through pipe 64 that is movable vertically with piston rod 61, pipe 64 moving in guide 64' and being connected to a source of compressed air. Air for depressing the glass-packing piston 60' is admitted to the upper end of cylinder 60 through branch 65 of pipe 52. Arranged adjacent to cylinder 60 is piston valve 66, the normal position of which is shown in Fig. 15, being so held against the pressure of spring 66', when piston 60' is raised, by levers 67 one end of which is engaged by body 63' of valve 63, as in Fig. 15. The function of this valve will be presently described.

The upward movement of the glass packing plunger 60', the retraction of mold lock 55, and the depression of plunger 68 are accomplished in the following manner, all of these operations being performed before carrier 2 is energized for advancing the mold from position A: A branch 69 of pipe 52 extends to cylinder 70 of a timing valve in which operates a floating piston 70'. Upon the admission of air to pipe 69, piston 70' is moved to the right, Fig. 15, and establishes communication with pipe 69' extending to the opposite side of butterfly valve 50 from pipe 46', thereby shifting said valve to the position shown in Fig. 15. The connection between live air line 51 and pipe 52 is thereby broken and communication is established between line 51 and pipe 71, the latter communicating at 71' with the lower end of cylinder 60, whereby piston 60' is elevated to the normal position shown in Fig. 15. The period during which the glass-packing mechanism is lowered and operative is timed by the movement of floating piston 70', and this may be regulated by a check valve 72' in pipe 72 which connects cylinder 70 with pipe 71, the cylinder exhausting through this last mentioned pipe.

The air admitted to pipe 71, in addition to raising piston 60' is communicated through pipe 73 to the inner end of mold lock cylinder 54, Fig. 19, and retracts lock 55 from the position shown in Fig. 17.

Plunger 68, Fig. 4, is raised and lowered by lever 75, Figs. 4 and 19, one end of which is connected to piston 76' of cylinder 76. The opposite end of the lever is forked to embrace the annular projection 68' on the stem of plunger 68. An inclined guide 75' on lever 75 is engaged by projection 68' as the mold and plunger are moved to position A, thereby raising the plunger and holding it raised as in Fig. 4. It is desirable to time the period during which the plunger is retained in contact with the glass in order that the glass forming the neck end of the blank may properly set. This period will vary with variations in working conditions, and is controlled in the following manner: When air is admitted to the upper end of cylinder 60 to depress piston 60', air is also admitted through pipe 83 to cylinder 78, thereby lowering timing piston 78' from the position shown in Fig. 15 and closing pipe 79. Upon the admission of air to pipe 71 it passes through branch 77 of the latter, Fig. 15, to the lower end of the time valve cylinder 78, thereby raising the then lowered floating piston 78'. Upon the elevation of this piston air is admitted to pipe 79 extending from cylinder 78 to one side of the reversible butterfly valve 80, Fig. 19, whereby air is admitted from the live air line 81 through pipe 82 to the lower end of cylinder 76, raising piston 76' and retracting plunger 68. The time required for the upward movement of floating plunger 78' is regulated by check valve 83' in pipe 83, Fig. 15, which connects the upper end of cylinder 78 with pipe 52, and by varying the adjustment of the check valve the withdrawal of the plunger may be timed as conditions may require.

For unlocking the blank mold carrier 2, pipe 79, in addition to serving valve 80, passes compressed air to several mechanisms presently to be described. Pipe 79 intersects valve 66 and is open through port 84 of said valve 66 when said port is moved by spring 66' into register with pipe 79, this occurring when lever 67 is released by the lowering of head 63' during the glass packing operation, at such time valve 66 taking the position shown in Fig. 15ª. Until valve 66 opens line 79, plunger 68 remains elevated and in contact with the glass and the carrier advancing mechanism remains inactive, the energizing of said parts being controlled by timing valve cylinder 78 and piston 78', as above described.

The mechanism for intermittently rotating the mold carriers and the parts involved in that operation will now be described, said mechanism being connected with the blank mold carrier 2. Rotatable beneath the latter on pedestal 3 is sleeve or collar 90, Figs. 9 and 10, and projecting therefrom is arm 91 which carries the normally raised spring bolt 92 which is adapted to enter one or another of a series of bolt openings 2' in the carrier for obtaining a hold on the latter for rotating it. Head 92' of bolt 92 is adapted to be moved to position beneath headed vertically movable retractor 93, the latter projecting from the piston of a cylinder 94. A link 95 connects sleeve 90 with a head 96 secured to a horizontal piston rod 97. One end of this rod is secured to piston 98' in power cylinder 98, and at the opposite end the rod is connected to piston 99' which is movable in the cushioning or compression cylinder 99. With clutch bolt 92 in engagement with the carrier, it will be seen that when piston rod 97 is moved toward the right, Figs. 1, 9 and 19, or toward the left Fig. 10, the carrier will be advanced, correspondingly advancing each mold to its next position.

Carrier 2 is secured or held following each intermittent movement, by the spring raised locking bolt 100, Fig. 11, which is adapted to engage, successively, the spaced openings 2' in the carrier. The bolt is retracted by lever 101 to which is connected the piston of cylinder 102. Also connected to lever 101 is valve 103, the normal position of which is shown in Fig. 19. A spring 100' on bolt 100 beneath lever 101 prevents the lever and bolt from dropping by gravity when the air is cut off from both the upper and lower ends of cylinder 94.

Arranged in the path of pins 96' projecting from piston rod head 96 are three tripper valves 104, 105 and 106, said valves being provided with the forked arms 104', 105' and 106', Figs. 10, 12, 13 and 14, respectively, and hence each of said valves is adapted to be oscillated in one direction during the forward reciprocation of piston rod 97 and head 96, and in a reverse direction by the backward reciprocation thereof. Valve 104 controls the flow of air through two lines, both of which are normally open as in Fig. 12. One of these lines is pipe 79 which extends from timing cylinder 78 and through valve 66 and the other is pipe 107 which extends to one side of the reversible butterfly valve 200, and with air in pipe 107, valve 200 is held normally in position shown in Fig. 15. The function of this valve will be presently described.

Valve 105 controls the flow of air through pipe 108 leading to the opposite side of valve 200, Fig. 19, and also controls the flow from live air line 109 through pipe 109' to the lower end of cylinder 102. The normal position of valve 104, wherein both air lines controlled thereby are normally open, is shown in Fig. 12, and the corresponding normal position of valve 105 with both air lines therethrough closed is shown in Fig. 13. Similarly the normally closed position of valve 106 is shown in Fig. 14.

With pipe 79 normally open through tripper valve 104, upon the admission of air to pipe 79 through valve 66, it flows through valve 104 and to top of cylinder 102, thereby depressing lever 101 from the position shown in Figs. 11 and 19, which results in lowering bolt 100 from engagement with carrier 2. The repression of lever 101 oscillates valve 103, from the position of Fig. 19 to that of Fig. 19ª, thereby connecting the live air line 110 with pipe 111 leading to the bottom of cylinder 94, raising retractor 93 as in Fig. 1 to position to engage clutch bolt 92. From pipe 111 air is admitted through pipe 112 to the outer end of the carrier actuating cylinder 98, causing rod 97 to move from left to right, Figs. 1, 9 and 19, and from right to left, Fig. 10, thereby advancing carrier 2 and placing clutch bolt 92 in engagement with retractor 93. This forward movement of piston rod 97 closes valve 104 to pipes 79 and 107, and opens valve 105 to pipes 108 and 109'. This results in the immediate flow of air through pipe 109' to the bottom of cylinder 102, thereby returning valve 103 to the position of Fig. 19. With valve 103 in this position air is admitted from live air pipe 110 to pipe 113 and through the then open tripper valve 105 to pipe 108 leading to the right hand side of butterfly valve 200, Fig. 15, and reversing the position thereof shown in said view. The result produced by this movement of valve 200 will be presently described. With live air admitted to pipe 113 through valve 103, it is communicated through pipe 114 to the top of cylinder 94, depressing retractor 93, and as the forward movement of piston rod 97 has advanced the clutch bolt 92 into engagement with the retractor, said bolt is lowered clear of carrier 2. Air from pipe 113 also passes through pipe 115 to the inner end of cylinder 98, retracting piston 98' and piston rod 97 to the position shown in Fig. 19. This backward movement of piston rod 97 restores valve 105 to its normal position shown in Fig. 13, shutting off live air from pipe 109' and closing communication between pipes 113 and 108. The compression in cylinder 99 resulting from the forward movement of piston 99' is communicated through pipe 116 to butterfly valve 80, reversing the latter and establishing communication between live air line 81 through pipe 117 to the top of cylinder 76, and the resulting depression of piston 76' shifts lever 75 into the position shown in Fig. 4.

The shifting of butterfly valve 200 from the position shown in Fig. 15 establishes communication between live air line 118 and pipe 119 extending to the top of cylinder 120 and lowers piston 120' therein thereby depressing piston rod 121 and lowering cap 122 at position B on the blank mold 11 that has been advanced from position A as in Fig. 5. The above described forward traverse of piston rod 97 shifts tripper valve 106 from its normally closed position shown in Fig. 14, and this results in the admission of compressed air from pipe 113 through pipe 123 leading therefrom and through valve 106 and pipe 124 to nipple 125. This nipple is held normally projected in guide 126 by spring 125', and with the blank mold at position B the nipple is in register, through port 127 in the mold base, with the lower end of the blank mold, all as shown in Fig. 5, at which time plunger 68 is in lowered position. By this means air is admitted to the plunger-formed cavity in the blank, and the blank is expanded in the then closed mold as in Fig. 5. The backward or return movement of piston rod 97 restores valve 106 to its normally closed position. Butterfly valve 200 having been restored to the position shown in Fig. 15 by the admission of live air through valve 104 to pipe 107, communication is thereby established between pipe 118 and pipe 128 extending to the bottom of cylinder 120, thereby raising cap 122 clear of the mold so that the latter may be advanced by the next intermittent movement of carrier 2 to position C.

In the preferred adaptation of the machine the mechanism for blowing the bottle into completed form at position I operates simultaneously with mold cap 122 and cylinder and piston 120, 120', the blowing operation being controlled by the butterfly valve 200. The blowing mechanism consists of a cylinder 130 supported by bracket 131 from column 7, and carried by the piston rod of cylinder 130 is the blowing head 132, the lower vertically movable portion 133 of which is adapted to seat on the blow mold at position I and embrace the projecting neck end of the bottle as in Fig. 2. The upward movement of part 133 opens valve 134 of the blow head, and as the upper end of piston rod 130' is connected to a source of compressed air, the latter is thereby admitted to the neck-embraced end of the blank for blowing it within the blow mold. Movable vertically in part 133 is the apertured head 135 which engages the top edge of the blank and is raised thereby as in Fig. 2. At the same time the air passing through valve 134 holds head 135 pressed against the blank, thereby sealing the connection. The bottom of head 135 is preferably covered with asbestos as indicated at 135' to provide the desired seal without marring the glass. With butterfly valve 200 in the normal position shown in Fig. 15 compressed air is admitted through pipe 136 to the bottom of cylinder 130, holding the blowing mechanism normally raised and inactive as in Fig. 1. Upon reversing valve 200 from the position shown in Fig. 15, at which time air is admitted to the top of cylinder 120 for lowering cap 122, air is also admitted through pipe 137 to the top of cylinder 130, thereby depressing the blowing mechanism to position shown in Fig. 2. From the foregoing it will be seen that the blowing mechanism is lowered and operative for only a very brief period.

The blow molds are provided with a locking mechanism at the blowing position I of the same construction as the lock for the blank mold at position A, illustrated in Fig. 17. This locking mechanism consists of a cylinder 138, Fig. 19, for actuating the locking head 139 which engages the lugs 25' projecting from the sections of each blow mold 25. The inner end of cylinder 138 is connected by branch 136' with pipe 136, so that the lock is held retracted while the blowing mechanism is in raised position. Pipe 137' connects pipe 137 with the outer end of the lock cylinder 138 with the result that the locking mechanism is actuated and is retained in locking position while the blowing mechanism is depressed as in Fig. 2.

Air for actuating cam 30 that opens and closes the blow molds is passed to opposite ends of cylinder 31 through pipes 140 and 141 respectively, the former extending to the inner end of the cylinder and holding the piston thereof normally retracted as in Figs. 3 and 20, and pipe 141 extends to the outer end of said cylinder for the admission of air which results in moving the cam from normal position. Pipes 140 and 141 are intersected by treadle valve 142, Figs. 8 and 19, and this valve is held normally raised by its spring with pipe 141 out of communication with compressed air line 142, and with pipe 140 in communication with pipe 113 as shown in Fig. 8. By this means cam 30 is normally held in the position shown in Figs. 3 and 20, but upon placing a blank in the blow mold at position F, the operative depresses treadle 32 which is connected to valve 142 by link 32', thereby momentarily shifting valve 142 and causing cam 30 to close the blow mold 25 which has received the blank. This momentary operation of the cam occurs simultaneously with the advancing movement of blow mold carrier 5 so that even after the cam has been retracted, roller 29 of the mold operating head 27 remains in engagement with the concentric portion of the cam and holds the mold closed.

From the foregoing description taken in connection with the drawings, it will be seen that the machine performs a complete cycle of operations, the cycle being started upon opening the valve 47 by means of the punty rod upon which the charge of glass is carried to the blank mold at position A. At the completion of the cycle each part of the machine has been restored to normal position and is in readiness for another operation. The machine requires but two operatives, one at position A for gathering the glass and placing it in the molds and starting the operation, and the other operative who works intermediate positions C F and J whose duty it is to transfer the blanks from the blank molds to the blow molds, to close the charged blow mold by depressing treadle F, and to remove the blown bottles from the molds as they advance to position F from position J.

The plunger head is preferably removably secured to a stem which actuates it as shown in Fig. 5, so that a plunger of different shape may be substituted whenever desired. As each blank mold has its individual plunger and neck mold, each of the five sets of mold mechanisms on the blank mold carrier may be of like form for producing bottles of the same kind, or two or more types of bottles of different shapes may be produced by the machine by correspondingly varying the sets of blank forming mechanisms.

I claim:—

1. The combination of a mold carrier, a mold mounted on the carrier and adapted to be placed by the latter in glass receiving position, a vertically movable plunger mounted on the carrier beneath the mold, means for projecting the plunger upwardly into the mold as the same approaches glass receiving position, and means for lowering the plunger before the carrier moves the mold from glass receiving position.

2. The combination of a mold carrier, a mold thereon adapted to be placed by the carrier in glass receiving position, a vertically movable plunger mounted on the carrier beneath the mold, means for projecting the plunger upwardly into the mold with said means operative as the mold approaches glass receiving position, means for packing the glass downwardly in the mold and around the elevated plunger, and means for lowering the plunger before the carrier advances the mold from receiving position.

3. The combination of a mold carrier, an open bottom mold mounted on the carrier, a vertically movable plunger mounted on the carrier beneath the mold, means operative when the mold approaches glass receiving position for projecting the plunger upwardly into the mold, means for withdrawing the plunger before the mold moves from glass receiving position, and means for varying the time intervening between projecting and withdrawing the plunger.

4. The combination of an intermittently movable mold carrier, a series of open bottom molds mounted on the carrier and adapted to be successively moved by the carrier into glass receiving position with the carrier at rest when so positioned, vertically movable plungers mounted on the carrier beneath the respective molds, means for projecting the plungers upwardly into their respective molds as the same approach glass receiving position, plunger retracting means constructed and arranged so as to retract each plunger while the carrier is at rest and before the mold moves from glass receiving position and means for varying the time intervening between projecting and retracting the plunger.

5. The combination of a mold carrier, means for intermittently moving the carrier, a mold mounted on the carrier, a plunger mounted on the carrier below the mold and adapted to coöperate with the mold, means for projecting the plunger into the mold as the same approaches glass receiving position, means for withdrawing the plunger from the mold when the carrier is at rest, and timing means controlling the movements of the carrier and the plunger withdrawing means whereby the movements of the carrier and said means are synchronized.

6. The combination of a mold carrier, means for intermittently moving the carrier, a series of molds mounted on the carrier and adapted to be successively moved by the carrier into glass receiving position with the carrier and molds at rest when so positioned, plungers mounted on the carrier—one for each mold, means for projecting the plungers into the molds as they approach the glass receiving position, a device having fixed position and operatively engaged by each plunger when in glass receiving position with the mold and carrier at a standstill, and adjustable timing means operatively connected to the carrier moving means and to said plunger retracting device for determining the time of withdrawal of the plunger and for synchronizing the movement of the carrier with such withdrawal.

7. The combination of a mold carrier, an open-top blank mold adapted to be placed by the carrier in glass receiving position, a vertically movable plunger mounted on the carrier beneath the mold, a device adapted to elevate the plunger as the latter and the mold move into glass receiving position, means coöperating with the open top of the mold for packing the glass downwardly therein and around the elevated plunger, and a timing device operatively connected to the plunger lifting device for timing the movement of the latter and thereby determining the time of the withdrawal of the plunger.

8. The combination of an intermittently movable mold carrier, a series of open top molds thereon adapted to be moved one after the other into glass receiving position, vertically movable plungers mounted on the carrier—one for each mold, a plunger raising and lowering device located at said glass receiving position and adapted to elevate each plunger into its mold as the latter moves into glass receiving position and before glass is placed in the mold, means coöperating with the open top of the mold for packing the glass downwardly in the mold and around the elevated plunger, and a timing device coöperating with the plunger moving device for determining the time the plunger is withdrawn from the mold.

9. The combination of a mold carrier, an open top mold thereon adapted to be moved thereby into glass receiving position, a vertically movable plunger on the carrier adapted to coöperate with the bottom of the mold, means for causing said plunger to enter said mold as it approaches glass receiving position, glass packing means adapted to coöperate with the top of the mold, glass cut-off mechanism having a fixed position and being operative above the mold at the glass receiving position, and means actuated by the movement of the cut-off mechanism for rendering the glass packing means and the plunger actuating means operative.

10. The combination of a mold, means for carrying the mold to and from glass receiving position, a vertically movable plunger beneath the mold, a cylinder and piston for projecting the plunger into the mold as it approaches said receiving position and for withdrawing it therefrom while at said position, an air line extending to said cylinder and adapted to admit air thereto for withdrawing the plunger, and a cylinder and piston interposed in said air line with the piston acted on by air admitted to said line and with the movement of said piston controlling the flow of air through the line to the plunger actuating cylinder.

11. The combination of an open top mold, a vertically movable plunger beneath and adapted to be projected into the mold and withdrawn therefrom, a device for raising and lowering the plunger, a cylinder and piston for actuating said device, a vertically movable air admitting head adapted to coöperate with the top of the mold for packing the glass therein and downwardly around the plunger, a compressed air line extending to the plunger actuating cylinder and adapted to pass air thereto for depressing the plunger, and a timing device comprising a cylinder and piston interposed in said air line with the movement of the piston controlling the passage of air through the line and to the plunger actuating cylinder.

12. The combination of an open top mold, a cylinder and piston above the mold and an air admitting head for the mold adapted to be raised and lowered by the piston, two air lines extending, respectively, to the top and bottom of said cylinder, a reversible valve common to said air lines for controlling the admission of air thereto respectively, compressed air actuated means for moving said valve to position to pass air to the bottom of said cylinder and a timing valve controlling the flow of air to said valve actuating means, said timing valve being in communication with the air line extending to the top of said cylinder, and means for moving said reversible valve to position to admit air to the top of said cylinder and to said timing valve.

13. The combination of an open top mold, a cylinder and piston above the mold, an air admitting head for the mold adapted to be raised and lowered by the piston, two air lines extending, respectively, to the top and bottom of said cylinder, a reversible valve common to said air lines for controlling the admission of air thereto respectively, compressed air actuated means for moving said valve to position to pass air to the bottom of said cylinder and a timing valve controlling the flow of air to said valve actuating means, said timing valve being in communication with the air line extending to the top of said cylinder, glass cut-off mechanism above and adapted to coöperate with the mold, and means actuated simultaneously with the cut-off device for moving said reversible valve into position to admit air to the top of said cylinder and to the timing valve.

14. The combination of an open top mold, a glass packing cylinder and piston above the mold, an air admitting head for the mold adapted to be raised and lowered by the piston, two air lines extending, respectively, to the top and bottom of said cylinder, a reversible valve adapted in different positions thereof to admit air to said lines respectively, a timing valve comprising a cylinder and piston with opposite ends of the cylinder connected to said air lines respectively, compressed air actuated means connected to the timing valve cylinder for moving the reversible valve into position to admit air to the bottom of the glass packing cylinder, the flow of air for thus moving the reversible valve being controlled by the movement of the timing valve piston, and means for shifting said reversible valve into position to admit air to the top of the glass packing cylinder and to the timing valve cylinder with the air thus admitted to the last mentioned cylinder operating to move the piston thereof for passing air for the above described movement of the reversible valve which admits air to the bottom of the glass packing cylinder.

15. The combination of an intermittently movable mold carrier, two molds on the carrier adapted to be moved respectively to glass receiving and glass blowing positions, means located at the glass receiving position for packing the glass in the mold, a plunger movable into said mold as the same approaches glass receiving position for forming a cavity in the lower end of the glass packed in the mold at said position, means operative at the blank blowing position for closing the top of the mold, and means operative at the blank blowing position for admitting air into the plunger formed cavity in the glass for expanding the latter, and means for causing the operations at the glass receiving and blank blowing positions to occur during the same period of rest of the mold carrier.

16. The combination of a mold, a plunger adapted to be projected upwardly thereinto, a vertically movable head adapted to admit compressed air into the mold for packing glass downwardly around the plunger, a cylinder and piston for effecting the withdrawal of the plunger from the mold, a pipe for supplying compressed air to said cylinder when withdrawing the plunger, a timing cylinder intersecting said pipe, a floating piston within the timing cylinder and operating to delay the flow of air through said timing cylinder to the plunger operating cylinder, a normally closed valve in said compressed air pipe, and means operating to open said valve when said compressed air admitting head is moved toward the mold for passing air thereinto.

17. The combination of a mold, a plunger adaped to be projected upwardly thereinto, a cylinder and a piston for effecting the withdrawal of the plunger, a pipe for supplying compressed air to the cylinder when withdrawing the plunger, a timing cylinder intersecting said pipe, a floating piston within the timing cylinder, a device for admitting compressed air into the mold for packing the glass downwardly around the plunger, a cylinder and piston for lowering and raising said device, an air supply pipe connected to the top of the last mentioned cylinder and also to said timing cylinder whereby when said air admitting device is depressed for connecting with the mold the floating piston is moved to position to obstruct the flow of air through the timing cylinder, a valve normally closing said air supply pipe extending to the plunger operating cylinder, and means actuated upon the movement of said air admitting device toward the mold for opening said valve.

18. The combination of an intermittently rotatable horizontal carrier, a mold thereon moved by said carrier to and from glass receiving position, a vertically movable plunger mounted on the carrier beneath the mold, means for projecting the plunger into the mold as the same approaches glass receiving position, a plunger retracting device having a fixed position with relation to the carrier and constructed to operatively connect with said plunger to retract the same before said mold leaves glass receiving position.

19. The combination of an intermittently rotatable horizontal carrier, a mold thereon, a vertically movable plunger mounted on the carrier beneath the mold, means for elevating said plunger, a lateral projection on the plunger, a forked lever mounted at one side of the path of movement of the plunger and adapted to embrace said projection between movements of the carrier and while the plunger is in elevated position, and means for actuating said lever to retract the plunger.

20. The combination of a horizontally movable carrier, a mold thereon, a vertically movable plunger mounted on the carrier beneath the mold and adapted to be projected thereinto, the plunger having a lateral projection, a vertically swinging lever at one side of the path of movement of the plunger, the lever having an inclined extension adapted to be engaged by the said plunger projection for elevating the plunger, and means for actuating said lever when the carrier is at a standstill for depressing the plunger.

In testimony whereof I affix my signature in presence of two witnesses.

FRANK O'NEILL.

Witnesses:
J. M. NESBIT,
ALEX S. MABON.